(12) United States Patent
Brooks et al.

(10) Patent No.: US 10,488,874 B2
(45) Date of Patent: Nov. 26, 2019

(54) OVERHEAD DISPLAY HAVING MULTI-COLOR INDICATORS FOR INDICATING MACHINE STATES

(71) Applicant: CNH Industrial America LLC, New Holland, PA (US)

(72) Inventors: Nathan P. Brooks, Manitowoc, WI (US); Steven N. Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 134 days.

(21) Appl. No.: 15/704,446

(22) Filed: Sep. 14, 2017

(65) Prior Publication Data

US 2019/0079547 A1   Mar. 14, 2019

(51) Int. Cl.
| | |
|---|---|
| *B60Q 1/00* | (2006.01) |
| *G05D 25/02* | (2006.01) |
| *G05B 15/02* | (2006.01) |
| *G05D 7/06* | (2006.01) |
| *A01B 79/00* | (2006.01) |

(52) U.S. Cl.
CPC .......... *G05D 25/02* (2013.01); *A01B 79/005* (2013.01); *G05B 15/02* (2013.01); *G05D 7/0676* (2013.01)

(58) Field of Classification Search
CPC ............................ G05B 15/02; G05D 7/0676
USPC ................................................. 340/438, 435
See application file for complete search history.

(56) References Cited

U.S. PATENT DOCUMENTS

| | | |
|---|---|---|
| 5,260,875 A | 11/1993 | Tofte et al. |
| 5,751,576 A | 5/1998 | Monson |
| 7,209,221 B2 | 4/2007 | Breed et al. |
| 7,315,252 B2 | 1/2008 | Ormachea et al. |
| 7,689,324 B1 | 3/2010 | Krenz et al. |
| 7,903,166 B2 | 3/2011 | Daly |
| 8,350,724 B2 | 1/2013 | Szczerba et al. |
| 8,374,790 B2 | 2/2013 | Gould et al. |
| 8,947,219 B2 | 2/2015 | Popovic |
| 9,134,986 B2 | 9/2015 | Ricci |
| 9,366,389 B2 | 6/2016 | Stewart et al. |
| 9,554,506 B2 | 1/2017 | Bittner et al. |
| 2012/0168528 A1 | 7/2012 | Hillger et al. |
| 2016/0041388 A1 | 2/2016 | Fujimaki et al. |
| 2016/0041803 A1 | 2/2016 | Markov et al. |
| 2016/0316739 A1 | 11/2016 | Brooks et al. |
| 2017/0023127 A1* | 1/2017 | Greasamar .......... F16H 59/0217 |

(Continued)

OTHER PUBLICATIONS

Patriot_40-Series-Sprayers_Full_line_Brochure_CIH07171303-CURRENT-2—(24) pages.

*Primary Examiner* — Tai T Nguyen
(74) *Attorney, Agent, or Firm* — Rebecca L. Henkel; Rickard K. DeMille

(57) ABSTRACT

A front overhead display panel can be configured in an operator cab of an agricultural machine so that an operator can quickly monitor current states of multiple functions of the machine while maintaining a forward view of the agricultural field. The display panel can include multiple multicolor indicators with each multicolor indicator corresponding to a function of the machine. A display controller can monitor current states of the functions and illuminate the indicators with select colors corresponding to the states. States can include activation, deactivation and/or susceptibility to machine control. Functions can include control with respect to spray sections, product pumps, rinse systems, steering modes, and the like.

18 Claims, 4 Drawing Sheets

(56) References Cited

U.S. PATENT DOCUMENTS

2017/0038595 A1 2/2017 Kutomi
2017/0282784 A1* 10/2017 Foster .................... A01B 76/00

* cited by examiner

OVERHEAD DISPLAY HAVING MULTI-COLOR INDICATORS FOR INDICATING MACHINE STATES

FIELD OF THE INVENTION

The invention relates generally to agricultural product application equipment such as self-propelled sprayers and, in particular, to a display system for monitoring functions of an agricultural machine including a display panel providing multicolor indicators for monitoring functions of the machine, in which the display panel is positioned above a forward facing window inside an operator cab of the agricultural machine so that the display panel is in an operator's field of view when an operator is looking through the forward facing window from inside the operator cab, and a display controller for operating the display panel.

BACKGROUND OF THE INVENTION

High-clearance sprayers are getting larger and more complex to allow for increasing coverage in a single pass, which improves application efficiency. Sprayers have numerous systems and functions that need to be controlled and monitored. However, monitoring the various system states available on modern sprayers can be challenging. That is because there are many different systems which may need to be monitored, and the state information available for such systems may be at different locations. In many instances, an operator may need to navigate through multiple display menus to determine desired state information. System state information can include, for example, which boom sections are activated/deactivated, as well as states of other systems, such as foamer systems, automatic steering systems, product pumps, and tank or sump statuses. Looking for system state information at different locations can be time consuming and distracting for the operator.

SUMMARY OF THE INVENTION

A front overhead display panel can be configured in an operator cab of an agricultural machine so that an operator can quickly monitor current states of multiple functions of the machine while maintaining a forward view of the agricultural field. The display panel can include multiple multicolor indicators with each multicolor indicator corresponding to a function of the machine. A display controller can monitor current states of the functions and illuminate the indicators with select colors corresponding to the states. States can include activation, deactivation and/or susceptibility to machine control. Functions can include control with respect to spray sections, product pumps, rinse systems, steering modes, and the like.

In one aspect, a forward facing display is positioned in the cab in line with the operator's view of the field. The display is connected to a control system of the machine so that states of various components of the machine can be quickly observed by the operator while maintaining a forward view of the field. Components of the machine which may be monitored via the display can include, for example, individual sprayer sections, spray booms, foamers, four-wheel steering, automating steering, liquid product pumps and rinse systems. States for each component can be distinguished by changing LED (Light Emitting Diode) colors on corresponding icons, such as green for indicating a component is presently activated, red for indicating the component is presently deactivated, and/or amber for indicating the component is presently deactivated but is predisposed to activate or is susceptible to activation by machine control. If a component is susceptible to activation by machine control, it can cycle, for example, between green (activated) and amber (deactivated, but susceptible again to activation) based on the machine's control methodology for the particular component. A component can be activated by the machine, for example, according to various sensed values, such as geographic location or speed.

Specifically then, one aspect of the present invention can provide a display system for monitoring functions of an agricultural machine. The display system can include: a display panel including multiple multicolor indicators for monitoring multiple functions of the agricultural machine, in which each multicolor indicator corresponds to a function, and in which the display panel is positioned above a forward facing window inside an operator cab of the agricultural machine so that the display panel is in an operator's field of view when an operator is looking through the forward facing window from inside the operator cab; and a display controller in communication with the display panel. The display controller can execute a program stored in a non-transient medium to: (a) monitor the functions and classify each function as corresponding to a state from among multiple states, including a first state indicating a present activation of the function and a second state indicating a present deactivation of the function; and (b) illuminate each multicolor indicator in a color from among multiple colors corresponding to the states, in which the colors can include a first color corresponding to the first state and a second color corresponding to the second state.

Another aspect of the present invention can provide an agricultural sprayer include: a chassis supported by multiple wheels; a sprayer boom extending transversely relative to the chassis; an operator cab supported by the chassis, the operator cab including a display panel including multiple multicolor indicators for monitoring a functions of the sprayer, in which each multicolor indicator corresponds to a function, and in which the display panel is positioned above a forward facing window inside the operator cab so that the display panel is in an operator's field of view when an operator is looking through the forward facing window from inside the operator cab; and a display controller in communication with the display panel. The display controller can execute a program stored in a non-transient medium to: (a) monitor the functions and classify each function as corresponding to a state from among multiple states, including a first state indicating a present activation of the function and a second state indicating a present deactivation of the function; and (b) illuminate each multicolor indicator in a color from among multiple colors corresponding to the states, in which the colors can include a first color corresponding to the first state and a second color corresponding to the second state.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
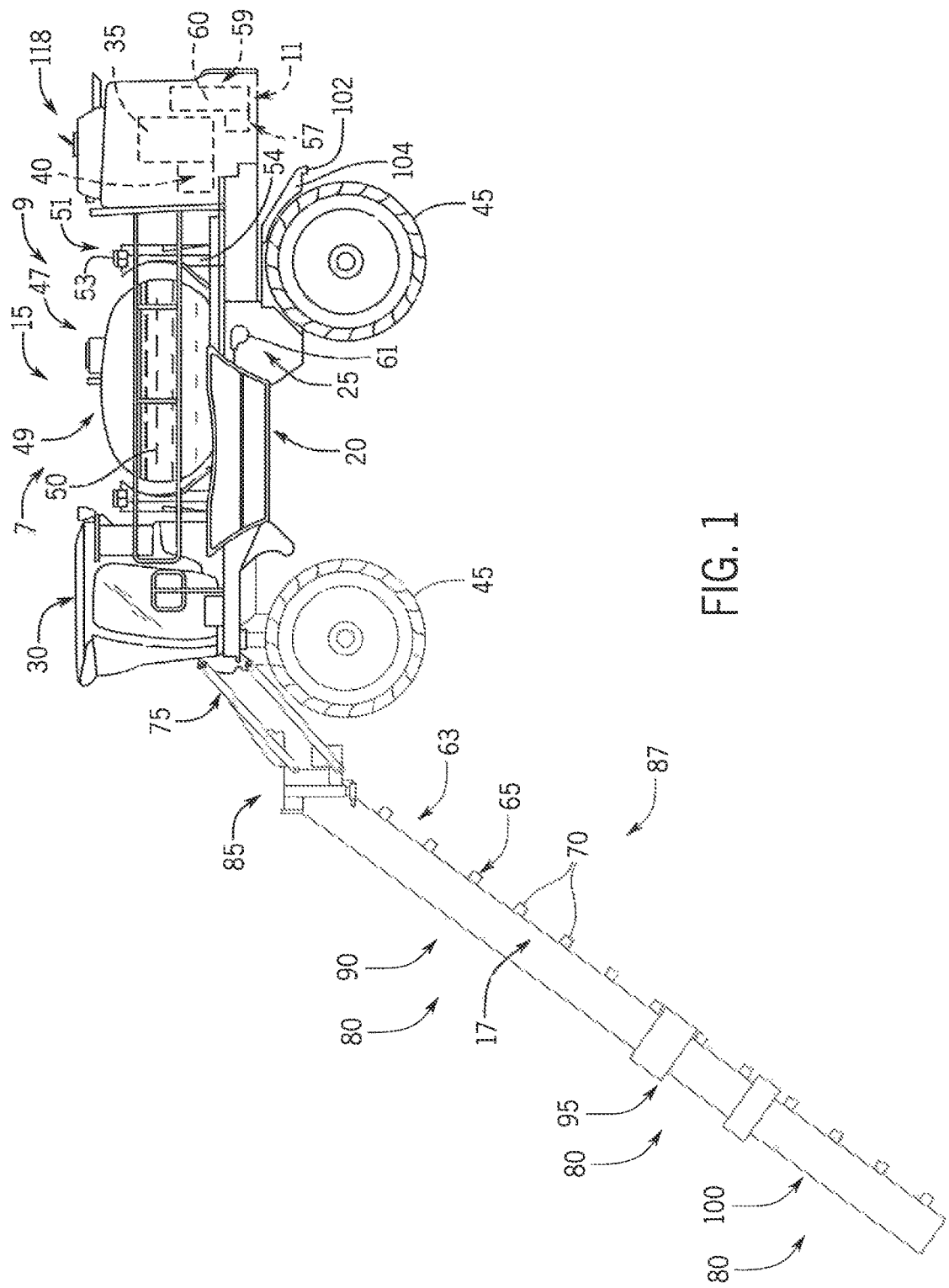
FIG. 1 is a side elevation of an exemplar agricultural machine according to the present invention.

Referring now to the drawings and specifically to FIG. 1, an agricultural sprayer is shown here as a self-propelled agricultural sprayer vehicle or self-propelled sprayer 15 having a spray boom 17, such as those available from CNH Industrial, including the Miller Nitro and Condor Series sprayers and New Holland Guardian Series sprayers. The sprayer 15 includes chassis 20 having chassis frame 25 that supports various assemblies, systems, and components. These various assemblies, systems, and components include an operator cab 30, an engine 35, and a hydraulic system 40. The hydraulic system 40 receives power from the engine 35 and includes at least one hydraulic pump which may be in a hydrostat arrangement for providing hydraulic pressure for operating hydraulic components within the hydraulic system 40. For sprayers with hydrostatic drives, hydraulic motors are operably connected to the hydraulic pump(s) for rotating wheels 45. In mechanical drive applications, a mechanical transmission receives power from engine 35 and delivers power for rotating wheels 45 by way of power-transmitting driveline components such as drive shafts, differentials, and other gear sets in portal, drop boxes, or other housings.

Still referring to FIG. 1, a product system 7 can include a product storage system 47 with a product tank 49 storing an agricultural liquid product 50 on the chassis 20. Product 50 can include any of a variety of agricultural liquid products, such as various pesticides, herbicides, fungicides, liquid fertilizers, and other liquids including liquid suspensions beneficial for application onto agricultural fields by way of boom 17. A rinse system 9 can include a rinse liquid storage system 51 having rinse tank 53 storing a rinse liquid 54 such as water or another suitable rinse liquid. Also, an air purge system 11 can include a compressed air storage system having an air compressor 57 operably connected to air tank 59 that stores air 60 compressed by compressor 57. A flow system is configured to selectively direct liquid product 50, rinse liquid 54, or air 60 through various flow paths defined through the sprayer 15 and boom 17 depending on whether a spraying procedure, a rinsing procedure, or a pneumatic purging or boom blow-out procedure is being performed. During spraying and rinsing procedures, the flow system can energize a pump 61 to convey either liquid product 50 or rinse liquid 54 to the boom 17.

In operation, the pump 61 can push either liquid product 50 or rinse liquid 54 through plumbing components such as interconnected pieces of tubing and through a boom flow system 63 that includes segments of boom tubing 65 for release out of spray boom nozzles 70 that are spaced from each another along the width of the boom 17 during spraying or rinsing operations of sprayer 15 (according to activation/deactivation states which can be implemented, for example, using electronically controlled switches). Accordingly, such plumbing components can connect the product storage system 47, the rinse liquid storage system 51 and the boom 17 via an on-board valve system and boom valve system. With additional reference to FIG. 2, groups or banks of multiple adjacent spray boom nozzles 70 define multiple spray sections 72 of a spray system of sprayer 15. During spraying procedures, spray sections 72 defined along the boom 17 can selectively deliver product 50 for release onto an agricultural field at locations corresponding to positions of activated spray sections 72. The boom 17 is connected to the chassis 20 with a lift arm assembly 75 that is configured to move the boom 17 up and down for adjusting the height of application of the product 50.

Figure 2:
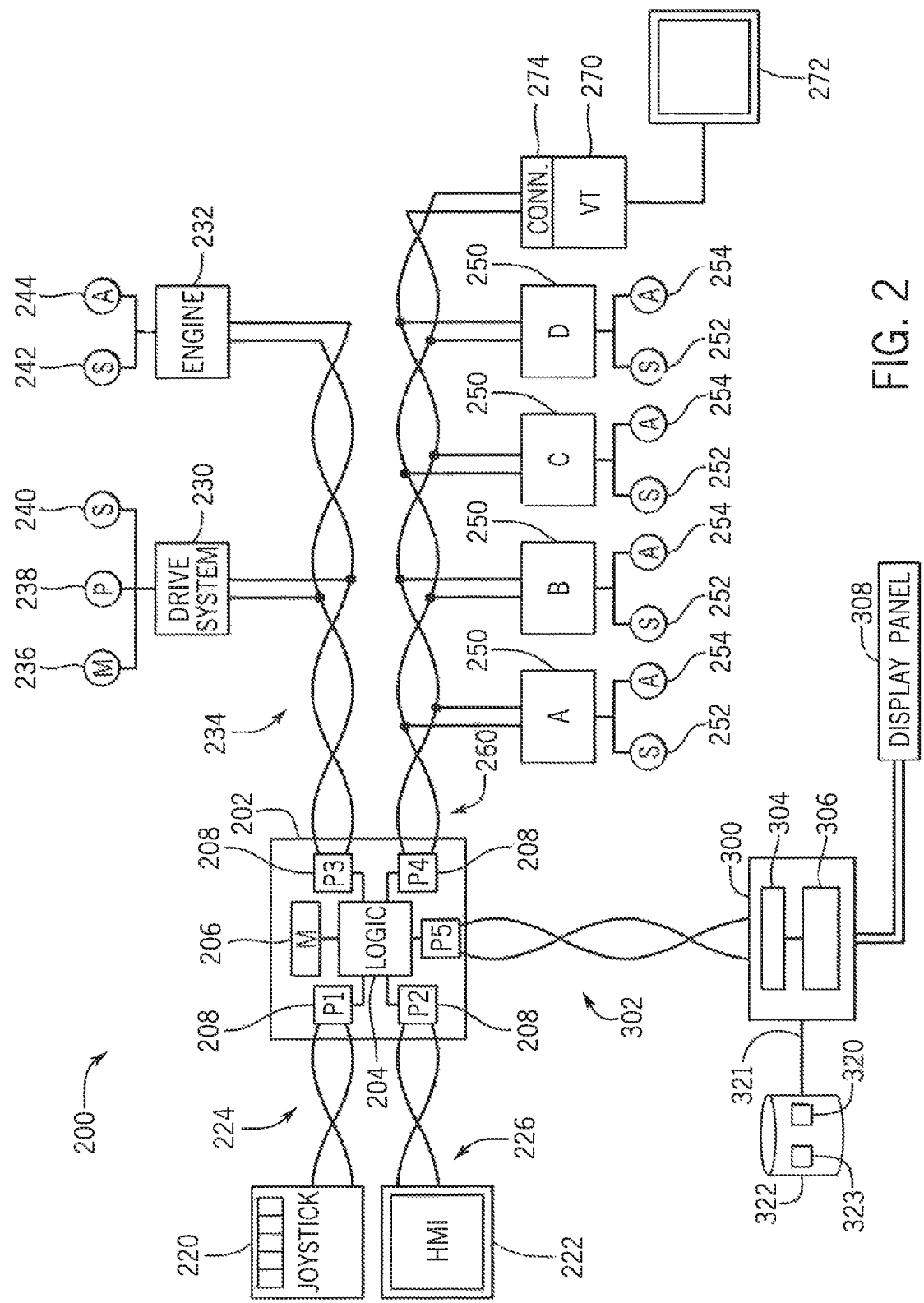
FIG. 2 is a simplified schematic of a display system for monitoring functions of the agricultural machine of FIG. 1.

Referring now to FIG. 2, a simplified schematic of a control system 200 for the sprayer 15 is provided in accordance with the present invention. The control system 200 includes a machine controller 202 which may comprise a processing element 204, a memory 206 and a plurality of ports 208, such as ports "P1," "P2," "P3" and "P4." Each of the ports 208 may be electrically and logically configured to communicate according to one of various Controller Area Network (CAN) bus interface protocols, including for example Society of Automotive Engineers (SAE) J1939, International Organization for Standardization (ISO) 11783 (ISOBUS), ISO 11898, and the like, whose specifications are published and whose protocols are used broadly by a number of manufacturers and suppliers, including CNH Industrial. Accordingly, each of the ports 208 may communicate messages to one or more devices connected to the respective port.

In the control system 200, one or more input modules may be connected to the machine controller 202, via the ports 208. The input modules may be positioned in the cab 30 such that they may be used to receive commands from an operator of the sprayer 15 for affecting various functions with respect to the machine. For example, a joystick 220 (or grip) may be a first input module connected to P1, and a touchscreen Human Machine Interface (HMI) 222 may be a second input module connected to P2. The joystick 220 may consist of a stick that pivots or otherwise moves along a base and sends a corresponding angle or direction as a command to the respective port. The joystick 220 may also include a plurality of buttons or switches for providing additional commands to the respective port, such as activation or deactivation of individual spray sections 72, activation or deactivation of automatic steering, height control of a center section with respect to the boom 17, tilt control of the boom 17, engine speed control, and the like, each of which being functions of the sprayer 15 subject to monitoring. The touchscreen HMI 222 may consist of a graphical user interface allowing display of one or more of the aforementioned functions while also permitting commands to the respective port by an operator touching the screen. The joystick 220 may be connected, for example, to port P1, via a first data communication bus 224 or path which could be a CAN bus implementing SAE J1939 via twisted pair cabling. Similarly, the touchscreen HMI 222 may be connected, for example, to port P2 via a second data communication bus 226 or path which could be a CAN bus implementing SAE J1939 via twisted pair cabling. However, in alternative arrangements, the joystick 220 and/or the touchscreen HMI 222 could be connected on the same data communication bus, or on different types of communication interfaces or paths, within the scope of the present invention.

In the control system 200, the machine controller 202 may also be connected to a hydrostatic drive system interface 230 and an engine interface 232. The machine controller 202 may connect to both the hydrostatic drive system interface 230 and the engine interface 232, for example, via a third data communication bus 234 connected to port P3 which could be a CAN bus implementing SAE J1939 via twisted pair cabling. The hydrostatic drive system interface 230 may, in turn, connect to one or more motors 236, pumps 238 and/or sensors 240 for affecting hydrostatic drive operation for the sprayer 15. Similarly, the engine interface 232 may, in turn, connect to one or more sensors 242 and/or actuators 244 for affecting engine operation for the sprayer 15.

Accordingly, commands provided by an operator in the cab 30, via the joystick 220, the touchscreen HMI 222, a steering wheel (not shown) or other input module, may be received by the machine controller 202 and routed to the corresponding system interface on the third data communication bus 234, such as to the hydrostatic drive system interface 230 or the engine interface 232. For example, moving the joystick 220 may result in sending a command to the machine controller 202, which, in turn, may result in the machine controller 202 sending an instruction to the engine interface 232 to adjust speed.

The machine controller 202 can also connect to a plurality of machine specific control modules 250, such as modules "A," "B," "C" and "D." Each of the machine specific control modules 250 may connect to the machine controller, for example, via a fourth data communication bus 260 connected to port P3, which could be a CAN bus implementing machine specific protocol via ISO 11783 twisted pair cabling. Each of the machine specific control modules 250 may be configured to control other functions of the sprayer 15. For example, (1) module A may be an agricultural product rate application module, which may control an agricultural product application function; (2) module B may be an automatic steering module, which may control an automatic steering function; (3) module C may be a sprayer boom height module, which may control a sprayer boom height adjustment function; and (4) module D may be a sprayer boom folding module, which may control a sprayer boom folding function. Accordingly, each of the machine specific control modules 250 may connect, in turn, to one or more sensors 252 and/or actuators 254 disposed on the sprayer 15 for accomplishing the respective function.

A Virtual Terminal (VT) or field computer 270 may also be connected to the fourth data communication bus 260 for communication with the modules "A," "B," "C" and "D." The field computer 270 could be a mobile computing system including a graphical display 272 for accomplishing various farming related functions and may be connectable to the fourth data communication bus 260 via a connector 274. The field computer 270 could be, for example, an Advanced Farming Systems Pro 700 as available from CNH industrial. An operator in the cab 30 may use the field computer 270 to control functions of the agricultural machine as controlled by the modules "A," "B," "C" and "D." For example, on a first screen page provided to the display 272, the field computer 270 could provide monitoring and control with respect to agricultural product application via module A. Similarly, on a second screen page provided to the display 272, the field computer 270 could provide monitoring and control with respect to automatic steering via module B, and so forth.

Figure 3:
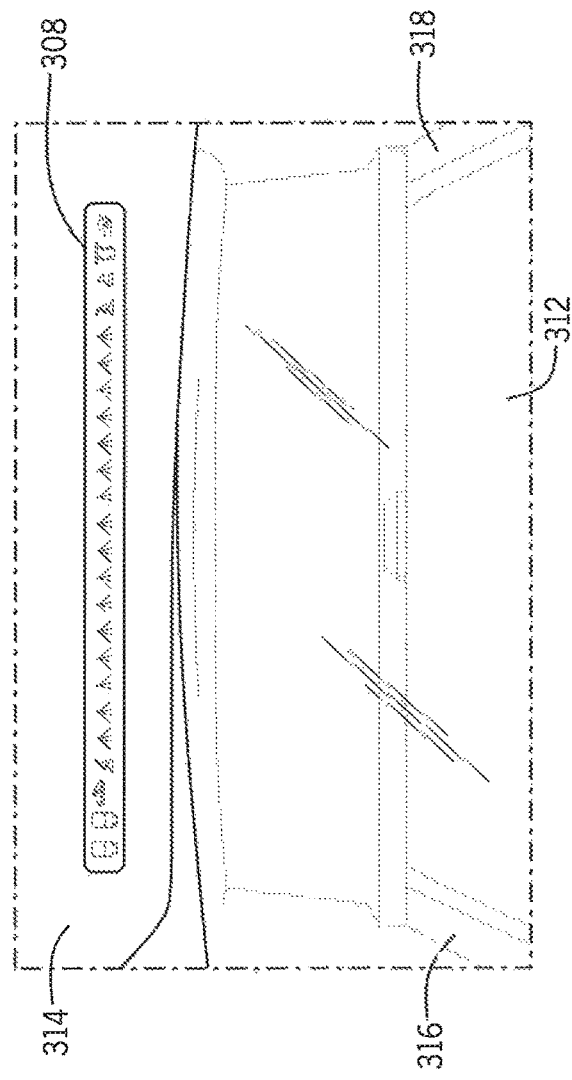
FIG. 3 an exemplar display panel positioned above a forward facing window inside an operator cab of the agricultural machine of FIG. 1.
Figure 4:
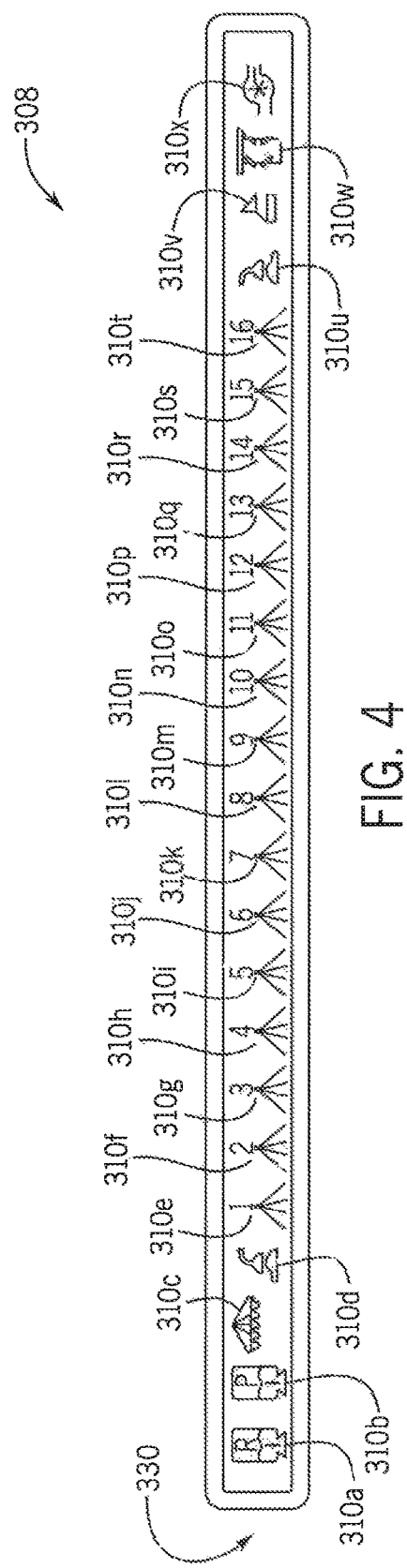
FIG. 4 is a detailed view of the display panel of FIG. 3.

The machine controller 202 can also be in communication with a display controller 300, via a port 208. The display controller 300 may be connected, for example, to port P5, via a fifth data communication bus 302 or path which could be a CAN bus implementing SAE J1939 via twisted pair cabling. The display controller 300 may include a processing element 304 and a memory 306. The display controller 300, in turn, can control a display panel 308. With additional reference to FIGS. 3 and 4, the display panel 308 can include multiple multicolor indicators 310 for monitoring the aforementioned functions of the sprayer 15. Accordingly, each indicator 310 can correspond to a function. By way of example: indicator 310a can correspond to control with respect to the rinse system 9, such as a sump valve of the rinse tank 53; indicator 310b can correspond to control with respect to the product system, such as a sump valve of the product tank 49; indicator 310c can correspond to control with respect to a master control of the spray boom 17 in which all of the spray sections 72 can be activated (when the master control is activated) or deactivated (when the master control is deactivated) together; indicator 310d can correspond to control with respect to a foamer system for placing a marker in the field with respect to a left side of the spray boom 17; indicators 310e-310t can correspond to control with respect to individual spray sections 72; indicator 310u can correspond to control with respect to a foamer system for placing a marker in the field with respect to a right side of the spray boom 17; indicator 310v can correspond to control with respect to automatic steering control of the sprayer 15, which may be according to a geographic location and a prescription map; indicator 310w can correspond to control with respect to four-wheel steering for of the sprayer 15, which may include all wheels being used for steering; and indicator 310x can correspond to control with respect to the pump 61 for agricultural liquid product.

The display panel 308 is preferably positioned above a forward facing window 312 inside the operator cab 30 so that the display panel 308 is in an operator's field of view when an operator is looking through the forward facing window 312 from inside the cab 30. For example, the display panel 308 can be positioned in an area where the ceiling 314 or overhead of the cab 30 is proximal to the forward facing window 312 or front windshield, and between left and right front pillars 316 and 318, respectively, supporting the ceiling 314.

The display controller 300 can execute a program 320 stored in a non-transient storage medium 322 to monitor the aforementioned functions of the sprayer 15 and classify each function as corresponding to a state from among multiple states in a state table 323. The state table 323, which can also be stored in the storage medium 322, can maintain states for each monitored function, which could include: a first state indicating a present activation of the function; a second state indicating a present deactivation of the function; and/or a third state indicating a present deactivation of the function with a predisposition to activate, such as according to the machine controller 202 executing to automatically activate or deactivate the function. In addition, display controller 300 can execute to illuminate each indicator 310 in a color from among a multiple colors corresponding to the aforementioned states, which could include: a first color, such as green, corresponding to the first state; a second color, such as red, corresponding to the second state; and/or third color, such as amber, corresponding to the third state.

By way of example, indicator 310e, corresponding to an individual spray section 72 along the spray boom 17, can be illuminated in the first, second or third colors, depending on the state of that individual spray section 72, as monitored by the display controller 300 and maintained in the state table 323. If the individual spray section 72 is activated by the operator, the display controller 300 can monitor the individual spray section 72 as being in the first state, and can illuminate the indicator 310e in the first color, such as green, accordingly. However, if the individual spray section 72 is deactivated by the operator, the display controller 300 can monitor the individual spray section 72 as being in the second state, and can illuminate the indicator 310e in the second color, such as red, accordingly. Also, if the individual spray section 72 is being automatically controlled, such as by the machine controller 202 depending on a location of the sprayer 15 with respect to a prescription map, the display controller 300 can monitor the individual spray section 72 as being in either the first state when the individual spray section 72 is activated, illuminating the indicator 310e in the first color, or the third state when the individual spray section 72 is deactivated, but still predisposed to being activated, illuminating the indicator 310e in the third color, such as amber. Accordingly, the display controller 300 can cycle between the first and third states, and illuminating the first and third colors to the display panel 308, respectively, based on the machine's control methodology for the particular component.

In addition, the display panel can further include multiple icons 330 in which each icon 330 correspond to an indicator 310. The icons 330 may be quickly comprehensible symbols of the aforementioned functions. For example, the indicator 310a, corresponding to the rinse system 9, can illuminate an icon 330a being a symbol of a tank with a letter "R" for rinse centered in the tank; the indicator 310b, corresponding to the product system, can illuminate an icon 330b being a symbol of a tank with a letter "P" for product centered in the tank; and so forth.

Figure 5:
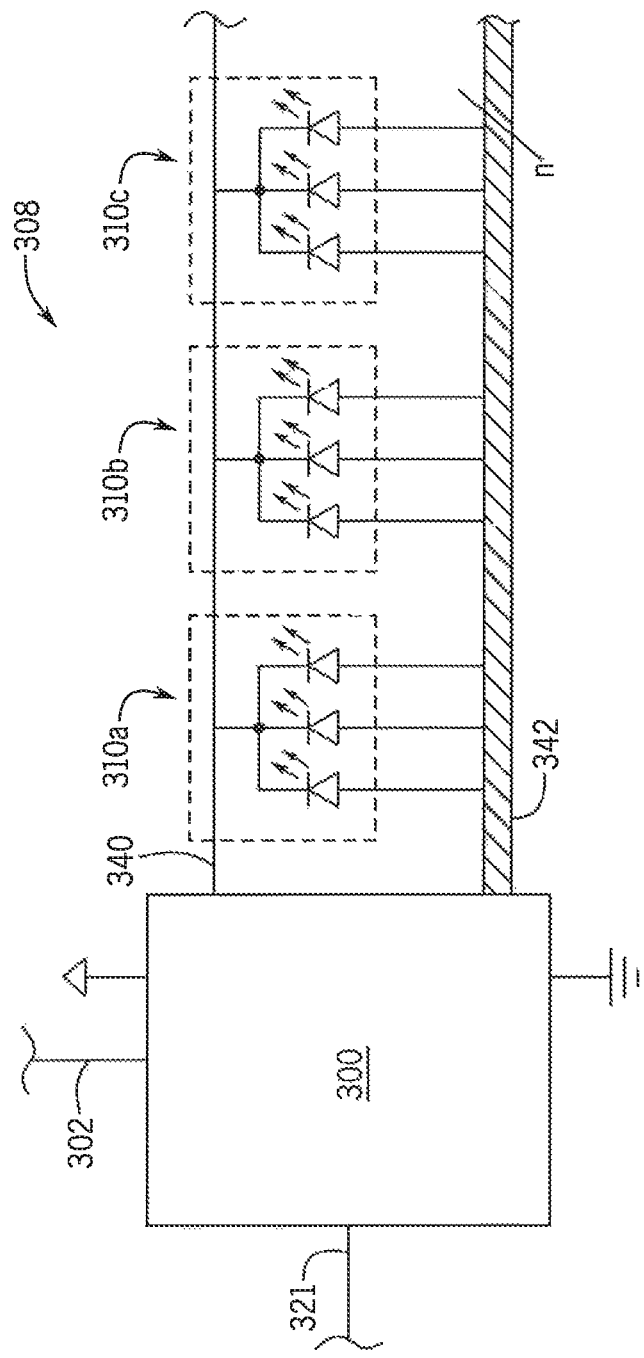
FIG. 5 is an exemplar schematic for controlling the display panel of FIGS. 2-4.

Referring now to FIG. 5, is an exemplar schematic for controlling the display panel 308 is provided. Each indicator 310 of the display panel 308 may comprise a plurality of Light Emitting Diodes (LED's) for producing the multiple colors according to the various states. In one aspect, each indicator 310 could include first, second and third LED's for illuminating red, green and blue colors, respectively, so that a broad spectrum of possible colors can be configured for each indicator 310 by the display controller 300 as desired by activating the first, second and third LED's in various ways. However, in another aspect, the first, second and third LED's could correspond to the first, second and third colors, such as green, red and amber, for the first, second and third states, respectively, thereby simplifying the logic which may be required by the display controller 300. Moreover, additional LED's of different colors could be provided for each indicator 310 for additional colors corresponding to additional states. The corresponding icons 330 may be placed over the indicators 310, so that light passes through them to illuminate the icon.

In one aspect as shown in FIG. 5, the display controller 300 could provide a common cathode 340 for each of the LED's of each of the indicators 310, while individually controlling multiple anode lines 342 in a bus arrangement of "n" signals. For the twenty-four indicators 310 illustrated in FIG. 4 by way of example, the bus arrangement could include seventy-two anode lines 342. However, in an alternative aspect, the display controller 300 could provide a common anode for each of the LED's of each of the indicators 310, while individually controlling multiple cathode lines in the bus arrangement.

Many changes and modifications could be made to the invention without departing from the spirit thereof. The scope of these changes will become apparent from the appended claims.

We claim:

1. A display system for monitoring functions of an agricultural machine, the display system comprising:

a display panel including a plurality of multicolor indicators for monitoring a plurality of functions performed by a plurality of components of the agricultural machine, wherein each multicolor indicator corresponds to a function of a corresponding component, and wherein the display panel is positioned above a forward facing window inside an operator cab of the agricultural machine so that the display panel is in an operator's field of view when an operator is looking through the forward facing window from inside the operator cab; and a display controller in communication with the display panel, the display controller executing a program stored in a non-transient medium to:

(a) monitor the plurality of functions and classify each function as corresponding to a state of the corresponding component from among a plurality of states, wherein the plurality of states includes a first state indicating a present activation of the function, a second state indicating a present deactivation of the function, and a third state indicating a present deactivation of the function with a predisposition to activate; and (b) illuminate each multicolor indicator in a color from among a plurality of colors corresponding to the states, wherein the plurality of colors includes a first color corresponding to the first state, a second color corresponding to the second state, and a third color corresponding to the third state.

2. The display system of claim 1, wherein the first color corresponding to the first state is green and the second color corresponding to the second state is red.

3. The display system of claim 1, further comprising a machine controller in communication with the display controller, the machine controller being configured to automatically activate or deactivate a select set of functions of the agricultural machine, wherein the display controller classifies each function of the select set of functions in the third state.

4. The display system of claim 1, wherein the third color corresponding to the third state is amber.

5. The display system of claim 1, wherein functions of the plurality of functions include individual control with respect to spray sections of the agricultural machine.

6. The display system of claim 1, wherein functions of the plurality of functions include a first function corresponding to control with respect to an agricultural liquid product pump and a second function corresponding to control with respect to a rinse system.

7. The display system of claim 1, wherein functions of the plurality of functions include a first function corresponding to control with respect to automatic steering of the agricultural machine and a second function corresponding to control with respect to four-wheel steering of the agricultural machine.

8. The display system of claim 1, wherein the display panel further includes a of plurality icons, wherein each icon corresponds to a multicolor indicator.

9. The display system of claim 1, wherein the multicolor indicators are Light Emitting Diodes (LED's).

10. An agricultural sprayer comprising:

a chassis supported by a plurality of wheels;

a sprayer boom extending transversely relative to the chassis;

an operator cab supported by the chassis, the operator cab including a display panel including a plurality of multicolor indicators for monitoring a plurality of functions of the components of the sprayer, wherein each multicolor indicator corresponds to a function of a corresponding component, and wherein the display panel is positioned above a forward facing window inside the operator cab so that the display panel is in an operator's field of view when an operator is looking through the forward facing window from inside the operator cab; and a display controller in communication with the display panel, the display controller executing a program stored in a non-transient medium to:
(a) monitor the plurality of functions and classify the function of the corresponding component as corresponding to a state from among a plurality of states, wherein the plurality of states includes a first state indicating a present activation of the function, a second state indicating a present deactivation of the function, and a third state indicating a present deactivation of the function with a predisposition to activate; and
(b) illuminate each multicolor indicator in a color from among a plurality of colors corresponding to the states, wherein the plurality of colors includes a first color corresponding to the first state, a second color corresponding to the second state, and a third color corresponding to the third state.

11. The sprayer of claim 10, wherein the first color corresponding to the first state is green and the second color corresponding to the second state is red.

12. The sprayer of claim 10, further comprising a machine controller in communication with the display controller, the machine controller being configured to automatically activate or deactivate a select set of functions of the agricultural machine, wherein the display controller classifies each function of the select set of functions in the third state.

13. The sprayer of claim 10, wherein the third color corresponding to the third state is amber.

14. The sprayer of claim 10, wherein functions of the plurality of functions include individual control with respect to spray sections defined along the sprayer boom.

15. The sprayer of claim 10, wherein functions of the plurality of functions include a first function corresponding to control with respect to an agricultural liquid product pump and a second function corresponding to control with respect to a rinse system.

16. The sprayer of claim 10, wherein functions of the plurality of functions include a first function corresponding to control with respect to automatic steering of the sprayer and a second function corresponding to control with respect to four-wheel steering of the sprayer.

17. The sprayer of claim 10, wherein the display panel further includes a of plurality icons, wherein each icon corresponds to a multicolor indicator.

18. The sprayer of claim 10, wherein the multicolor indicators are Light Emitting Diodes (LED's).

* * * * *